US007601291B2

(12) United States Patent
Ohira

(10) Patent No.: US 7,601,291 B2
(45) Date of Patent: Oct. 13, 2009

(54) INK-JET RECORDING APPARATUS

(75) Inventor: Hideo Ohira, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 538 days.

(21) Appl. No.: 11/566,778

(22) Filed: Dec. 5, 2006

(65) Prior Publication Data

US 2007/0139497 A1 Jun. 21, 2007

(30) Foreign Application Priority Data

Dec. 15, 2005 (JP) ............................ 2005-362309

(51) Int. Cl.
*B29C 71/00* (2006.01)

(52) U.S. Cl. ...................................................... 264/344

(58) Field of Classification Search ................... 347/85, 347/92, 93; 264/232, 233, 234, 340, 341, 264/344, 345, 346, 347; 106/31.86
See application file for complete search history.

(56) References Cited

U.S. PATENT DOCUMENTS

| | | | | |
|---|---|---|---|---|
| 7,146,728 | B2 * | 12/2006 | Tsuda et al. | 29/890.1 |
| 7,163,980 | B2 * | 1/2007 | Mashita et al. | 525/88 |
| 2005/0116984 | A1 | 6/2005 | Tsuda et al. | |

FOREIGN PATENT DOCUMENTS

| | | |
|---|---|---|
| JP | 2003 305872 | 10/2003 |
| JP | 2005 119288 | 5/2005 |
| JP | 2006 027003 | 2/2006 |

* cited by examiner

*Primary Examiner*—Anh T. N. Vo
(74) *Attorney, Agent, or Firm*—Baker Botts L.L.P.

(57) ABSTRACT

The ink-jet recording apparatus employing an elastic member in at least a part of an ink passage into which a water-based ink for ink-jet recording is filled is configured to satisfy the following inequality (1):

$$(T_1/T_0)\times 100 \leqq \text{about } 200\% \quad (1),$$

wherein $T_1$ is filtration time when a first ink is filtrated through a specific electroformed filter, the first ink being prepared by immersing an elastic member in a water-based ink for ink-jet recording under a prescribed condition, and $T_0$ is filtration time when a second ink is filtrated through the electroformed filter having same specifications as the above-mentioned filter, the second ink under another condition.

16 Claims, No Drawings

INK-JET RECORDING APPARATUS

BACKGROUND OF THE INVENTION

1. Field of the Invention

The present invention relates to an elastic member employed in an ink passage of an ink-jet recording apparatus.

2. Description of the Related Art

Various ink-jet recording methods are known such as a thermal method and a piezo method. In the thermal method, a bubble is generated by means of rapid heating to eject ink from fine nozzles. In the piezo method, ink is ejected from fine nozzles by use of a piezoelectric element which deforms under impressing. The ink-jet recording method is a technology for forming an image by allowing a plurality of color inks of basic colors to selectively land on paper as fine droplets of several picoliters to several tens of picoliters.

The ink-jet recording method has advantages over other methods in that high text printing quality and high image printing quality can be obtained by controlling the ejection of the fine droplets. An image with sharp edges within image areas, no graininess and color reproduction close to full color can be formed by allowing the fine droplets of several picoliter volumes to land on paper from sufficiently fine nozzles with a high accuracy. In order to enable such an ejection of fine droplets, a high accuracy landing control technology is required. In order to facilitate this, it is necessary to prevent foreign materials interfering with the flow of ink from entering a portion in an ink-jet recording apparatus. This portion may be filled with ink, or may be a portion that comes into contact with the ink (hereinafter, each such portion is referred to as an ink passage). Therefore, several methods have been attempted to prevent the entry of the foreign materials into the ink passage. Specifically, for example, the assembly of the ink passage and the manufacturing of the ink are performed in a clean room, and ink is employed which is subjected to microfiltration through a filter having a pore size of less than 1 μm.

In an ink passage of an ink-jet recording apparatus, various elastic members are employed. For example, these elastic members may include: a cap which covers the nozzles of an ink-jet head; a wiper which cleans ink-jet head nozzle surfaces; a packing seal which is placed at the joint portion between components; a tube which supplies ink from an ink tank to the ink-jet head if the ink tank is provided separately from the ink-jet head; and the like. Generally, materials employed for constituting such elastic members are usually low cost and easily workable materials. Furthermore, additives such as a vulcanization agent and a vulcanization accelerator are added to these elastic members. When the elastic members come into contact with ink, these additives are dissolved out of the elastic members and precipitate in the ink passage. But it depends on the type of solvent used in the ink. Therefore, even when attempts are made to prevent the entry of foreign materials at the time of assembly of the ink passage and at the time of manufacture of the ink, the ink passage can only be maintained in a clean condition at an initial stage. In particular, if a temperature change or aging occurs within the ink passage filled with the ink or within the ink passage in contact with the ink, the additives tend to dissolve out of the elastic members employed in the ink passage and cause precipitation. The precipitations are formed not only in the ink before ejection from the nozzles, but also in ink adhering to the nozzle cap, the wiper or the like after ejection from the nozzles. Furthermore, the thus-formed precipitations may be supplied to the ink-jet head nozzles or to the periphery thereof through actions such as wiping or purging of the afore-mentioned nozzles. Precipitations in the nozzles or the periphery of the nozzles cause instability of the meniscus of the nozzles, the occurrence of clogging of the nozzles and a reduction in the water-repellency of the nozzle surface caused by flaws on the water-repellency film of the nozzle surface. Hence, the precipitations interfere with the high precision ink ejection, resulting in a reduction in image quality.

In view of such a problem, a method intended to overcome this has been proposed. In this method, rubber materials to be employed in an ink passage are immersed in water at 60° C. in a sealed container for a predetermined time to determine the amount of resultant dissolved materials, whereby a suitable rubber material is selected. In addition to this, another proposal has been put forward. In this proposal, the material to be employed to come into contact with ink would have an amount of fatty acid salts dissolved therefrom of less than or equal to a specific value when a sample piece of the material is immersed in the ink at 70° C. for 10 days.

However, even when a material selected using the method of either of the above-mentioned proposals is employed for an elastic member constituting an ink passage, a problem still exists in that the formation of precipitations in the ink passage cannot be prevented completely. This is because, since ink contains a high boiling point organic solvent and water, the appropriate selection of the elastic member is very difficult to make under the conditions in which an elastic material is simply immersed in water. Furthermore, precipitation components contained in an elastic member are not limited to the above-mentioned fatty acid salts. Components dissolved out of an elastic member into water or ink include a component which precipitates easily and a component which resists precipitation. Thus, even when the dissolved amount is simply measured, the measured value does not always correspond directly to the actual occurrence of precipitation.

SUMMARY OF THE INVENTION

The present invention has been devised to solve the above-mentioned problems. Accordingly, it is an object of the present invention to enable the stable provision of a high quality image in an ink-jet recording apparatus. The object is achieved by suppressing the formation of precipitations in an ink passage, not only at an initial state in which ink is introduced into the ink passage or comes into contact therewith, but also when a temperature change or aging of the ink occurs during actual use.

The present inventors have found that when an elastic member is employed in an ink passage of an ink-jet recording apparatus, the occurrence of precipitations may be adequately predicted by evaluating the permeability of the ink through a specific filter medium. Specifically, the evaluation is performed as follows. An elastic member to be employed in the ink passage is immersed under specific conditions in the ink employed in the ink-jet recording apparatus. Subsequently, this ink is filtrated through the specific filter medium to evaluate its permeability.

Accordingly, the present invention provides an ink-jet recording apparatus in which an elastic member is employed in at least a part of an ink passage into which a water-based ink for ink-jet recording is filled. The ink-jet recording apparatus is characterized by satisfying the following inequality (1):

$$(T_1/T_0)\times 100 \leqq \text{about } 200\% \quad (1),$$

wherein $T_1$ is filtration time when 20 mL of a first ink is filtrated through an electroformed filter having an effective area of 7.6

$cm^2$, about 16500 pores and a pore size of 13 μm, the first ink being prepared by immersing an elastic member in a water-based ink for ink-jet recording in a volume of 0.5 mL per 1 $cm^2$ of surface area of the elastic member at 60° C. for 14 days; and subsequently at room temperature for 7 days, and $T_0$ is filtration time when 20 mL of a second ink is filtrated through an electroformed filter having the same specifications as the above-mentioned electroformed filter, the second ink being prepared by allowing the same ink as the above-mentioned water-based ink to stand at 60° C. for 14 days and subsequently at room temperature for 7 days.

Furthermore, the present invention provides a selection method for an elastic member to be employed in an ink passage of an ink-jet recording apparatus using a water-based ink for ink-jet recording. The selection method for an elastic member is characterized in that an elastic member satisfying the above-mentioned inequality (1) is selected.

Moreover, the present invention provides a treating method for an elastic member to be employed in an ink passage of an ink-jet recording apparatus into which a water-based ink for ink-jet recording is filled. The treating method for an elastic member is characterized in that an elastic member not satisfying the above-mentioned inequality (1) is subjected to an immersion-washing treatment in which the elastic member is immersed in an aqueous solution of a penetrant at about 60° C. to about 80° C. for 4 days or more.

According to the selection method of the present invention, an elastic member satisfying the above-mentioned inequality (1) is selected as an elastic member employed in the ink passage of an ink-jet recording apparatus. According to the ink-jet recording apparatus of the present invention in which the thus-selected elastic member is employed in the ink passage thereof, the formation of precipitations from the ink into the ink passage is suppressed during actual use. Therefore, a high quality image may be stably obtained by means of ink-jet recording.

Furthermore, according to the treating method of the present invention, an elastic member not satisfying the above-mentioned inequality (1) is subjected to an immersion-washing treatment in which the elastic member is immersed in an aqueous solution of a penetrant. In this manner, components causing precipitations when the elastic member is employed in the ink passage are dissolved and removed from the elastic member. Therefore, in an ink-jet recording apparatus, the formation of precipitations in the ink passage may be suppressed by employing the elastic member subjected to the immersion-washing treatment in the ink passage.

DETAILED DESCRIPTION OF THE PREFERRED EMBODIMENTS

The present invention will next be described in detail.

The selection method for the elastic member of the present invention is a method for selecting an elastic member to be used in the ink passage of an ink-jet recording apparatus using a water-based ink. The selection is made such that the selected elastic member does not cause the formation of precipitations in the ink passage during actual use in the ink-jet recording apparatus.

The ink-jet recording apparatus may be a known ink-jet recording apparatus employing an elastic member in the ink passage. No limitation is imposed on an ink ejection method, and a thermal method, a piezo method or any other method may be employed.

The elastic members employed in the ink passage of the ink-jet recording apparatus include: a cap which covers the nozzles of an ink-jet head; a rubber packing which is provided between the nozzles and an ink supply passage; a wiper which cleans nozzle surfaces; a tube which supplies ink from an ink tank to the ink-jet head if the ink tank is provided separately from the ink-jet head; a packing seal which is held between a buffer tank and a head unit, as disclosed in Japanese Patent Application Laid-Open No. 2006-27003; and the like.

Examples of the rubber base polymer forming such elastic members include, but not limited to, isobutylene-isoprene rubber polymer (IIR), ethylene propylene diene rubber polymer (EPDM), isoprene rubber polymer (IR), butadiene rubber polymer (BR), styrene-butadiene rubber polymer, silicone rubber polymer (Q), chloroprene rubber polymer (CR), urethane rubber polymer, nitrile rubber polymer, acrylic rubber polymer, fluororubber polymer and the like. Of these, the isobutylene-isoprene rubber polymer (IIR) is preferable, and the ethylene propylene diene rubber polymer (EPDM) represented by the following formula is also preferable in terms of slidability:

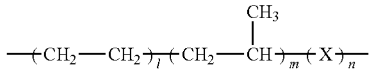

wherein X represents a non-conjugated diene compound such as ethylidene norbornene, dicyclopentadiene or 1,4-hexadiene.

A commercial product may be employed as the rubber base polymer. Examples of the commercial ethylene propylene diene rubber polymer (EPDM) include, but not limited to, EP331 (product of JSR Corporation), ESPRENE® 505 (product of SUMITOMO CHEMICAL CO., Ltd.) and the like.

Additives which may be added to the elastic members include a vulcanization agent, a vulcanization accelerator, a filler, a softening agent, a scorch retarder, an antioxidant and the like.

Examples of the vulcanization agent include, but not limited to, sulfur, zinc oxide, a peroxide, p-quinone dioxime, p,p'-dibenzoylquinone dioxime, 4,4'-dithiodimorpholine, poly-p-dinitrosobenzene, N,N'-m-phenylenedimaleimide, ammonium benzoate and the like.

Examples of the vulcanization accelerator include, but not limited to, zinc dithiocarbamate, 2-mercaptobenzotriazole, dibenzothiazyl disulfide, zinc mercaptobenzotriazole, 2,4-dinitrophenylthiobenzotriazole, N-cyclohexy-2-benzotriazolyl sulfenamide, N-tert-butyl-2-benzotriazolyl sulfenamide, N-oxydiethylene-2-benzotriazolyl sulfenamide, N,N-dicyclohexyl-2-benzotriazolyl sulfenamide, hexamethylene tetramine, butylaldehyde aniline, butylaldehyde monobutylamine, diphenylguanidine, di-o-tolylguanidine, o-tolylbiguanidine, tetramethylthiuram monosulfide, tetramethylthiuram disulfide, tetraethylthiuram disulfide, tetrabutylthiuram disulfide, dipentamethylenethiuram hexasulfide, zinc dimethyldithiocarbamate, zinc diethyldithiocarbamate, zinc dibutyldithiocarbamate, zinc ethylphenyldithiocarbamate, zinc N-pentamethylenedithiocarbamate, copper dimethyldithiocarbamate, iron dimethyldithiocarbamate, sodium dimethyldithiocarbamate, sodium diethyldithiocarbamate, sodium dibutyldithiocarbamate, zinc n-butylxanthate, zinc o,o-di-n-butylphosphorodithiophosphate, diphenylthiourea, ethylene thiourea, trimethylthiourea, diethylthiourea and the like.

Examples of the filler include, but not limited to, carbon black, calcium carbonate, silicon dioxide and the like. Examples of the softening agent include, but not limited to, paraffin oil and the like. Further, additives such as a scorch retarder are added in accordance with application.

Generally, a mold lubricant, a lubricant and the like are often employed in the elastic member. However, if a mold lubricant, a lubricant and the like are employed at the time of molding elastic member, these form precipitations. Therefore, an elastic member not employing a release agent, a lubricant and the like at the time of molding is preferably selected.

In the selection method for the elastic member of the present invention, the elastic member employed in the ink passage of an ink-jet recording apparatus satisfying the following inequality (1) is selected so that the formation of precipitations in the ink passage is not caused during actual use in the ink-jet recording apparatus:

$$(T_1/T_0)\times 100 \leqq \text{about } 200\% \qquad (1),$$

wherein $T_1$ is filtration time when 20 mL of a first ink is filtrated through an electroformed filter having an effective area of 7.6 $cm^2$, about 16500 pores and a pore size of 13 μm, the first ink being prepared by immersing an elastic member in a water-based ink for ink-jet recording in a volume of 0.5 mL per 1 $cm^2$ of surface area of the elastic member at 60° C. for 14 days, and subsequently at room temperature for 7 days; and $T_0$ is filtration time when 20 mL of a second ink is filtrated through an electroformed filter having the same specifications as the above-mentioned electroformed filter, the second ink being prepared by allowing the same ink as the above-mentioned water-based ink to stand at 60° C. for 14 days and subsequently at room temperature for 7 days.

In this selection method, the ink in which the elastic member is immersed is an ink to be employed in an ink-jet recording apparatus employing the elastic member. This is for the purpose of suppressing the formation of precipitations in an ink passage when the ink is employed in the ink-jet recording apparatus on which the elastic member is mounted. Additionally, as in such an ink, an aqueous solution prepared by removing specific components from the composition of the ink may be employed as a solution for immersing the elastic member in. Specifically, such a solution is prepared by removing, from the composition of the ink, a coloring agent, a preservative, an anticorrosive and the like which do not affect the dissolution of components causing precipitations.

When the above-mentioned filtration time $T_1$ is determined, the number of the immersion days and the volume and temperature of the ink in which the elastic member is first immersed are determined in terms of performing an accelerated test which corresponds to storage at room temperature for approximately 2 years. Furthermore, the temperature and the number of days of the subsequent immersion in the ink at room temperature are set to provide time for allowing materials dissolved in the ink to precipitate.

Moreover, in the selection method for the elastic member of the present invention, an elastic member satisfying inequality (1) is selected. This means that an elastic member is selected in which, when the elastic member is immersed in ink, the amount of components dissolved therefrom and precipitated thereafter is small enough that the filtration time $T_1$ satisfies at least inequality (1). Therefore, other methods are included in the present selection method in addition to the method in which the test for determining the above-mentioned filtration times $T_1$ and $T_0$ is performed to thereby select an elastic member which satisfies inequality (1). For example, the following method may be employed. First, an elastic member is immersed in an ink under the conditions in which a larger amount or more kinds of components are likely to be dissolved from the elastic member than those in the immersion performed for measuring the above-mentioned immersion time $T_1$. In this case, for example, the immersion temperature for the first 14 days may be set at higher than 60° C., or the number of the immersion days may be set at more than 14 days. The immersion is continued at room temperature for a predetermined number of days, and subsequently filtration time $T_1'$ of the thus-prepared ink is determined. Subsequently, filtration time $T_0'$ is determined. The filtration time $T_0'$ is the filtration time of an ink which is stored without immersing the elastic member at the same temperature as that of the above first immersion in the ink and is subsequently allowed to stand at room temperature for the predetermined number of days. Finally, an elastic member is selected which has a ratio $T_1'/T_0'$ (%) of about 200% or less. In this case, if the above-mentioned filtration time ratio $T_1/T_0$(%) is determined under the above-mentioned conditions, the selected elastic member always has a ratio $T_1/T_0$(%) of less than about 200%.

In addition to this, the treating method for the elastic member of the present invention is characterized in that an elastic member not satisfying the above-mentioned inequality (1) is subjected to an immersion-washing treatment in which the elastic member is immersed in an aqueous solution of a penetrant at about 60° C. to about 80° C. for about 4 days or more. By means of the immersion-washing treatment employing this aqueous solution of a penetrant, components which possibly cause precipitations in an ink passage of an ink-jet recording apparatus when the elastic member is employed in the ink passage may be dissolved and removed from the elastic member in advance.

A penetrant generally employed in a water-based ink for ink-jet recording may be employed as the penetrant. Examples of such a penetrant include, but not limited to, glycol ethers such as diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether and tripropylene glycol butyl ether; and the like. Of these, dipropylene glycol propyl ether, triethylene glycol butyl ether and the like are preferable because they have a large dissolving effect with respect to components which possibly cause precipitations in the ink passage.

Furthermore, the aqueous solution of the penetrant may be an aqueous solution of one or a plurality of the above-mentioned penetrants, or may contain other components in addition to the penetrant. Therefore, a water-based ink for ink-jet recording containing a penetrant may be employed as the aqueous solution of the penetrant. In particular, it is convenient to employ an ink possibly to be employed in the ink-jet recording apparatus employing the elastic member.

The amount of the penetrant in the aqueous solution of the penetrant is preferably in the range of about 0.1 wt. % to about 20 wt. % with respect to the total amount of the aqueous solution of the penetrant in terms of the wettability with the surface of the elastic member and the solubility of the elastic member itself.

When the volume of the aqueous solution of the penetrant employed in the immersion-washing treatment is too small, the dissolving-removing effect of the components causing precipitations in the ink passage from the elastic member is unsatisfactory. Therefore, generally, the volume of the aqueous solution is preferably about 3 mL or more per 1 $cm^2$ of the surface area of the elastic member and more preferably about 10 mL or more.

The immersion temperature is preferably about 60° C. to about 80° C. and more preferably about 70° C. to about 80° C. in terms of effectively extracting components causing precipitations. The number of immersion days is preferably about 4 days or more and more preferably about 7 days to about 10 days in terms of effectively extracting components causing precipitations.

Preferably, the elastic member subjected to the immersion-washing treatment detailed above is washed with pure water and is subsequently employed in the ink passage.

The ink-jet recording apparatus of the present invention is an ink-jet recording apparatus in which an elastic member is employed in at least a part of the ink passage and is characterized by satisfying the above-mentioned inequality (1). Here, in order to determine whether or not the elastic member satisfies inequality (1), an ink is employed which is actually filled into the ink-jet recording apparatus or is prepared for the ink-jet recording apparatus.

Further examples of the elastic member employed in this ink-jet recording apparatus include, but not limited to: an elastic member which is found to satisfy inequality (1) by means of the above-mentioned selection method; an elastic member which is subjected to the above-mentioned treating method for an elastic member for dissolving and removing therefrom components possibly causing precipitations in the ink passage to thereby satisfy inequality (1); and the like.

EXAMPLES

The present invention will now be specifically described by way of examples.

(1) Preparation of Elastic Members

All the components of rubber 1 having a composition shown in Table 1 were kneaded by means of a kneader. Subsequently, the kneaded mixture was heated at 165° C. for 7 minutes for molding and primary vulcanization to thereby obtain a nozzle cap.

In addition to this, all the components of rubber 2 having a composition shown in Table 1 were kneaded by means of a twin roll mill. Subsequently, the kneaded mixture was heated at 175° C. for 10 minutes for molding and primary vulcanization and was then heated at 150° C. for 4 hours for secondary vulcanization to thereby obtain a wiper.

TABLE 1

(Unit: Parts by weight)

| | | Rubber sheet 1 | Rubber sheet 2 |
|---|---|---|---|
| Polymer | Ethylene propylene diene rubber polymer *1 | — | 100 |
| | Isoprene-isobutylene rubber polymer *2 | 100 | — |
| Vulcanization agent | Zinc oxide | 5 | 5 |
| | Dicumyl peroxide | — | 2.7 |
| Vulcanization accelerator | Tetramethylthiuram disulfide | 1.5 | — |
| Filler | Carbon black | 50 | 100 |
| Softening agent | Paraffin oil | 30 | 50 |
| Scorch retarder | Phthalic anhydride | — | 0.2 |

*1: EP331, product of JSR Corporation
*2: HT-1066, product of JSR Corporation (2) Selection Test for Elastic Members (Before the Immersion-Washing Treatment)

The components of the composition shown in Table 2 were mixed under sufficient stirring and were filtrated through a membrane filter of 0.8 μm to thereby prepare the ink. The selection test for the nozzle cap made of the rubber 1 was performed by use of this ink as follows. First, the nozzle cap made of the rubber 1 was immersed in the ink in a volume of 0.5 mL per 1 $cm^2$ of surface area of the nozzle cap at 60° C. for 14 days and subsequently at room temperature for 7 days. Subsequently, 20 mL of the ink into which the nozzle cap was immersed was filtrated through an electroformed filter having an effective area of 7.6 $cm^2$, about 16500 pores and a pore size of 13 μm to measure the filtration time $T_1$ required for the filtration. In addition to this, only the ink was stored at 60° C. for 14 days and was subsequently left to stand at room temperature for 7 days. 20 mL of this ink was filtrated through an electroformed filter having the same specifications as the above-mentioned electroformed filter to measure the filtration time $T_0$ required for the filtration. Then, the ratio of the filtration time $T_1/T_0$(%) was determined. The value of the ratio $T_1/T_0$(%) was evaluated according to the following three ratings.

A: 130% or less.

B: More than 130% and 200% or less.

C: More than 200%.

For the wiper made of the rubber 2, the filtration times $T_1$ and $T_0$ were measured by immersing the wiper in the inks as in the case of the nozzle cap made of the rubber 1. The ratio $T_1/T_0$(%) was determined and evaluated according to the three ratings.

These results are shown in the field entitled “before immersion-washing treatment” in Table 3.

As can be seen from Table 3, when the immersion-washing treatment is not performed, both the nozzle cap made of the rubber 1 and the wiper made of the rubber 2 are not appropriate as elastic members employed in an ink-jet recording apparatus.

(3) Immersion-Washing Treatment of Elastic Members

Washing solutions 1 and 2, having compositions shown in Table 2, were prepared as in the case of the preparation of the above-mentioned ink.

The nozzle cap made of the rubber 1 was immersed at 70° C. in 1000 ml of the washing solution 1 (in a volume of 10 mL per 1 $cm^2$ of surface area) and was left to stand at this temperature for 7 days to perform the immersion-washing treatment. Subsequently, the nozzle cap was washed with pure water.

In addition to this, other nozzle caps made of the rubber 1 were subjected to the immersion-washing treatment by use of the washing solution 2 and the ink in place of the washing solution 1, and were then washed with pure water.

Further to this, the wipers made of the rubber 2 were subjected to the immersion-washing treatment by use of the washing solution 1, the washing solution 2 and the ink, and were then washed with pure water.

(4) Selection Test for Elastic Members (After the Immersion-Washing Treatment)

The selection test was performed as in the item (2) for each of the elastic members subjected to the immersion-washing treatment. The results are shown in the field entitled “after the immersion-washing treatment” in Table 3.

In addition to this, the evaluation of durability was performed for the elastic members before and after the immersion-washing treatment as follows:

Step 1:

The ink prepared in the item (2) was separately filled into four cartridges. In this manner, the evaluation was made at n=4 by use of the same ink to thereby improve the reliability of the evaluation.

Step 2:

The four ink cartridges were attached to an ink-jet recording apparatus.

Step 3:

The nozzle surface was observed under a microscope to determine the presence or absence of any flaws in the water-repellency film.

Step 4:

A special check pattern for the test was test-printed to determine whether or not the ink was normally ejected from all the nozzles.

Step 5:

Normal purging (including a wiping action) and test printing were performed three successive times.

Step 6:

The ink-jet recording apparatus was left to stand at 40° C. for 2 weeks.

Step 7:

Step 5 was carried out again.

Step 8:

Step 6 was carried out again.

Step 9:

24 sets of steps 5 and 6 were additionally performed (the total was therefore 26 sets).

Step 10:

Step 5 was carried out again.

The durability was evaluated using three ratings according to the following criteria. The results are shown in the field entitled "after immersion-washing treatment" in Table 3.

A: No difference is found between the printed material of the test printing in step 4 and the printed material of the test printing in step 11.

B: No difference is found between the printed material of the test printing in step 4 and the printed material of the test printing in step 11, but the amount of flaws found in step 12 is relatively larger than that found in step 3.

C: In contrast to the printed material of the test printing in step 4, ejection failures such as deformation, bending and non-ejection occur in the printed material of the test printing in step 11. The amount of flaws in the water-repellency film found in step 12 is larger than that in step 3.

TABLE 2

(Unit: wt. %)

| | Ink | Washing solution 1 | Washing solution 2 |
|---|---|---|---|
| Dipropylene glycol propyl ether (DPGPE) | 1.0 | 10.0 | — |
| Triethylene glycol-n-butyl ether (TEGBE) | 1.0 | — | 10.0 |
| Water | 68.7 | 90.0 | 90.0 |
| Glycerin | 25.0 | — | — |
| SUNNOL ® NL-1430 *1 | 0.3 | — | — |
| C.I. Direct Blue 199 | 4.0 | — | — |

*1 Polyoxyethylene alkyl ether sulfate-based surfactant; product of Lion Corporation

TABLE 3

| | | Before immersion-washing treatment | | | | | After immersion-washing treatment | | | | | |
|---|---|---|---|---|---|---|---|---|---|---|---|---|
| Test No. | Elastic member | Filtration time: T1 *1 | Filtration time: T0 | T1/T0 (%) | Evaluation | Durability evaluation | Aqueous Solution of penetrant | Filtration time: T1 | Filtration time: T0 | T1/T0 (%) | T1/T0 Evaluation | Durability evaluation |
| 1 2 3 | Rubber 1 (nozzle cap) | 480 sec. or more | 81 sec. | 593% or more | C | C | Washing solution 1 | 85 sec. | 81 sec. | 105% | A | A |
| | | | | | | | Washing solution 2 | 93 sec. | 81 sec. | 115% | A | A |
| | | | | | | | Ink | 135 sec. | 81 sec. | 167% | B | B |
| 4 5 6 | Rubber 2 (wiper) | 302 sec. | 81 sec. | 373% | C | C | Washing solution 1 | 82 sec. | 81 sec. | 101% | A | A |
| | | | | | | | Washing solution 2 | 89 sec. | 81 sec. | 110% | A | A |
| | | | | | | | Ink | 120 sec. | 81 sec. | 148% | B | B |

*1 Measurement of the filtration time is terminated at 480 seconds.

Step 11:

The ejection stability of the printed material at the last set was evaluated by use of the special check pattern for the test.

Step 12:

The nozzle surface was observed under a microscope to determine the state of any flaws in the water-repellency film.

As can be seen from Table 3, for each of the rubbers 1 and 2, the filtration time ratio $T_1/T_0$(%) exceeds 200% in the selection test before the immersion-washing treatment, and thus the durability evaluation results are poor. However, when the immersion-washing treatment is performed, the amount of precipitations coming out of the ink is significantly reduced. Therefore, the filtration time $T_1$ is significantly shortened, and the filtration time ratio $T_1/T_0$(%) becomes 200% or less. Hence, a high quality image can be formed stably for a long time.

The ink-jet recording apparatus, the selection method for the elastic member and the treating method for the elastic member of the present invention are useful for maintaining a high level quality image over a long time by stably ejecting ink droplets during use of the ink-jet recording apparatus.

The entire disclosure of the specification, summary and claims of Japanese Patent Application No. 2005-362309 filed on Dec. 15, 2005 is hereby incorporated by reference.

What is claimed is:

1. An ink-jet recording apparatus comprising an elastic member being employed in at least a part of an ink passage into which a water-based ink for ink-jet recording is filled, wherein the ink-jet recording apparatus is configured to satisfy the following inequality (1):

$$(T_1/T_0)\times 100 \leqq \text{about } 200\% \qquad (1),$$

wherein $T_1$ is filtration time when 20 mL of a first ink is filtrated through an electroformed filter having an effective area of 7.6 $cm^2$, about 16500 pores and a pore size of 13 μm, the first ink being prepared by immersing an elastic member in a water-based ink for ink-jet recording in a volume of 0.5 mL per 1 $cm^2$ of surface area of the elastic member at 60° C. for 14 days, and subsequently at room temperature for 7 days; and $T_0$ is filtration time when 20 mL of a second ink is filtrated through an electroformed filter having the same specifications as the above-mentioned electroformed filter, the second ink being prepared by allowing the same ink as the above-mentioned water-based ink to stand at 60° C. for 14 days and subsequently at room temperature for 7 days.

2. The ink-jet recording apparatus according to claim 1, wherein the elastic member is at least one selected from the group consisting of isobutylene-isoprene rubber polymer, ethylene propylene diene rubber polymer, isoprene rubber polymer, butadiene rubber polymer, styrene-butadiene rubber polymer, silicone rubber polymer, chloroprene rubber polymer, urethane rubber polymer, nitrile rubber polymer, acrylic rubber polymer and fluororubber polymer.

3. The ink-jet recording apparatus according to claim 1, wherein the elastic member is the isobutylene-isoprene rubber polymer or the ethylene propylene diene rubber polymer represented by the following formula:

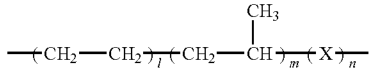

wherein X represents a non-conjugated diene compound.

4. The ink-jet recording apparatus according to claim 3, wherein the non-conjugated diene compound is ethylidene norbornene, dicyclopentadiene or 1,4-hexadiene.

5. A selection method for an elastic member to be employed in an ink passage of an ink-jet recording apparatus using a water-based ink for ink-jet recording, the method comprising selecting an elastic member satisfying the following inequality (1):

$$(T_1/T_0)\times 100 \leqq \text{about } 200\% \qquad (1),$$

wherein $T_1$ is filtration time when 20 mL of a first ink is filtrated through an electroformed filter having an effective area of 7.6 $cm^2$, about 16500 pores and a pore size of 13 μm, the first ink being prepared by immersing an elastic member in a water-based ink for ink-jet recording in a volume of 0.5 mL per 1 $cm^2$ of surface area of the elastic member at 60° C. for 14 days, and subsequently at room temperature for 7 days; and $T_0$ is filtration time when 20 mL of a second ink is filtrated through an electroformed filter having the same specifications as the above-mentioned electroformed filter, the second ink being prepared by allowing the same ink as the above-mentioned water-based ink to stand at 60° C. for 14 days and subsequently at room temperature for 7 days.

6. The selection method for an elastic member according to claim 5, wherein the elastic member is at least one selected from the group consisting of isobutylene-isoprene rubber polymer, ethylene propylene diene rubber polymer, isoprene rubber polymer, butadiene rubber polymer, styrene-butadiene rubber polymer, silicone rubber polymer, chloroprene rubber polymer, urethane rubber polymer, nitrile rubber polymer, acrylic rubber polymer and fluororubber polymer.

7. The selection method for an elastic member according to claim 5, wherein the elastic member is the isobutylene-isoprene rubber polymer or the ethylene propylene diene rubber polymer represented by the following formula:

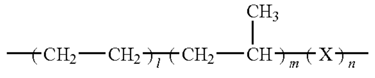

wherein X represents a non-conjugated diene compound.

8. The selection method for an elastic member according to claim 7, wherein the non-conjugated diene compound is ethylidene norbornene, dicyclopentadiene or 1,4-hexadiene.

9. A treating method for an elastic member to be employed in an ink passage of an ink-jet recording apparatus into which a water-based ink for ink-jet recording is filled, the method comprising subjecting an elastic member not satisfying the following inequality (1) to an immersion-washing treatment in which the elastic member is immersed in an aqueous solution of a penetrant at about 60° C. to about 80° C. for 4 days or more:

$$(T_1/T_0)\times 100 \leqq \text{about } 200\% \qquad (1),$$

wherein $T_1$ is filtration time when 20 mL of a first ink is filtrated through an electroformed filter having an effective area of 7.6 $cm^2$, about 16500 pores and a pore size of 13 μm, the first ink being prepared by immersing an elastic member in a water-based ink for ink-jet recording in a volume of 0.5 mL per 1 $cm^2$ of surface area of the elastic member at 60° C. for 14 days, and subsequently at room temperature for 7 days; and $T_0$ is filtration time when 20 mL of a second ink is filtrated through an electroformed filter having the same specifications as the above-mentioned electroformed filter, the second ink being prepared by allowing the same ink as the above-mentioned water-based ink to stand at 60° C. for 14 days and subsequently at room temperature for 7 days.

10. The treating method for an elastic member according to claim 9, wherein the elastic member is at least one selected from the group consisting of isobutylene-isoprene rubber polymer, ethylene propylene diene rubber polymer, isoprene rubber polymer, butadiene rubber polymer, styrene-butadiene rubber polymer, silicone rubber polymer, chloroprene rubber polymer, urethane rubber polymer, nitrile rubber polymer, acrylic rubber polymer and fluororubber polymer.

11. The treating method for an elastic member according to claim 9, wherein the elastic member is the isobutylene-isoprene rubber polymer or the ethylene propylene diene rubber polymer represented by the following formula:

$$-(CH_2-CH_2)_l-(CH_2-\overset{\overset{\displaystyle CH_3}{|}}{CH})_m-(X)_n-$$

wherein X represents a non-conjugated diene compound.

12. The treating method for an elastic member according to claim 9, wherein the non-conjugated diene compound is ethylidene norbornene, dicyclopentadiene or 1,4-hexadiene.

13. The treating method for an elastic member according to claim 9, wherein the penetrant is at least one selected from the group consisting of diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether and tripropylene glycol butyl ether.

14. The treating method for an elastic member according to claim 9, wherein the penetrant is dipropylene glycol propyl ether or triethylene glycol butyl ether.

15. The treating method for an elastic member according to claim 9, wherein the amount of the penetrant in the aqueous solution of the penetrant is in the range of about 0.1 wt. % to about 20 wt. % with respect to the total amount of the aqueous solution of the penetrant.

16. The treating method for an elastic member according to claim 9, wherein in the immersion-washing treatment, the elastic member is immersed in the aqueous solution of the penetrant at about 60° C. to about 80° C. for 4 days or more, so that the volume of the aqueous solution is 3 mL or more per 1 $cm^2$ of the surface area of the elastic member.

* * * * *